United States Patent

[11] 3,594,620

[72] Inventors David W. Husted
Ann Arbor, Mich.;
James A. Holbrook, St. Petersburgh, Fla.;
Frederick K. Soll, Ann Arbor, Mich.
[21] Appl. No. 787,795
[22] Filed Dec. 30, 1968
[45] Patented July 20, 1971
[73] Assignee Baia Corporation
Jackson, Mich.

[54] REAR LIGHTED PROJECTOR WITH DUAL ELECTRIC MOTOR DRIVE
7 Claims, 7 Drawing Figs.
[52] U.S. Cl. .................................................. 318/7,
318/67, 318/113
[51] Int. Cl. ................................................ H02p 5/46
[50] Field of Search ....................................... 318/6, 7,
49, 51, 67, 98, 99, 113; 242/201, 202, 203, 205

[56] References Cited
UNITED STATES PATENTS
3,254,287 5/1966 Wolfner ........................ 318/7

Primary Examiner—Oris L. Rader
Assistant Examiner—Thomas Langer
Attorney—Beaman & Beaman ABSTRACT: The invention pertains to viewing apparatus for motion-picture film and particularly concerns rear- or back-lighted motion-picture viewing devices of the type commonly known as viewers, editors, and the like, and may include microreaders and other film magnifying and projecting apparatus wherein the film image is projected upon the rear surface of a translucent screen. The projecting and viewing apparatus includes a substantially horizontal deck upon which film reels are supported and the projector includes a front screen panel receiving the projected image. The film spindles are individually powered by electric motors associated with speed reduction gear trains, and the motor control circuit connects the motors in series such that both motors will be driven in either direction of reel spindle rotation and a supplemental current is maintained upon the motor winding film in order to insure the existence of a tension within the film.

PATENTED JUL 20 1971

INVENTORS
DAVID W. HUSTED
JAMES A. HOLBROOK
BY  FREDERICK K. SOLL

Beaman & Beaman
ATTORNEYS

INVENTORS
DAVID W. HUSTED
JAMES A. HOLBROOK
FREDERICK K. SOLL
BY
Beaman & Beaman
ATTORNEYS INVENTORS
DAVID W. HUSTED
JAMES A. HOLBROOK
FREDERICK K. SOLL
BY Beaman & Beaman
ATTORNEYS

3,594,620

REAR LIGHTED PROJECTOR WITH DUAL ELECTRIC MOTOR DRIVE

BACKGROUND OF THE INVENTION

The invention pertains to rear-lighted film-projecting apparatus utilizing electric motor drives for the winding and rewinding of film upon reel spindles.

Motion-picture film viewers and editors presently available for use with 8 mm. or 16 mm. film normally include a housing or casing in which the projecting apparatus is mounted and the film is supported upon arms or the like disposed upon opposite sides of the projector casing wherein the film may be pulled through the film track defined upon the housing while the film is oriented in a substantially horizontal manner. This type of apparatus is rather awkward in appearance and use in that the reels are disposed upon each side of the housing and somewhat separated therefrom and are susceptible to damage and misuse. As a matter of handling, shipping and storing convenience the arms supporting the film reels are often foldable to an inoperative or storage position adjacent the projector housing, and are folded at right angles to the associated housing side when in use.

With the aforesaid type of motion-picture viewer it was heretofore not been practical to use electric drive means for moving the film through the viewer. The assignee's previously filed U.S. application Ser. No. 577,271 filed Sept. 6, 1966, discloses a motion-picture viewer of the aforedescribed type having a practical electric motor drive. However, the assignee's aforementioned electric driven viewer still retains the disadvantages of the "wing" type film reel supports.

Additionally, it has not heretofore been possible to provide an electric motor drive for film spindles for a motion-picture viewer wherein a smooth and consistent driving operation in either direction of winding may be maintained at a wide variety of speed ranges, and wherein the tension upon the film may be accurately controlled.

SUMMARY OF THE INVENTION

The invention is directed to an improvement in rear-lighted motion-picture and film projectors, and to an improved electric drive for film viewers wherein both the wind and rewind reel spindles are separately energized by electric motors associated with speed reduction gear trains, and the electric motor control is of such a type as to power the motors in both directions of spindle rotation, and an auxiliary current is imposed upon the motor driving the spindle winding film to insure the proper tension in the film being wound.

The motion-picture viewer in accord with the invention basically consists of a boxlike enclosure or housing having front, back and lateral sidewalls and a substantially horizontally disposed upper deck. The reel spindles extend through the upper deck wherein the film reels may be located upon the spindles and are disposed in a substantially horizontal manner adjacent the deck as to lie substantially within the vertical projection of the configuration of the projector housing. In this manner the conventional objectionable "wing" type reel spindle supports are completely eliminated and the motion-picture viewer has a much more concise and integral appearance than heretofore. Additionally, the improved construction of the motion-picture viewer permits the translucent viewing screen to be located in the front wall of the housing, and a viewer of this type has improved versatility over previous viewers in that it may be used for viewing and editing motion picture film or may be used as a visual device for demonstration or advertising purposes.

With a motion-picture viewer constructed in accord with the aforedescribed arrangement the film will be vertically oriented while located upon the viewer and will pass through a vertically disposed film track. Threading and film handling are conveniently achieved and the operator is able to readily view the film while simultaneously observing the position of the film relative to the film gate and the other viewer components.

The electric motor drive for the motion-picture viewer in accord with the invention employs a pair of small reversible direct current electric motors each driving a speed-reducing gear train having an output shaft operatively connected to a film reel spindle. The electric motors are associated with a control circuit utilizing a power transistor in turn controlled by a small control transistor which senses the electrical characteristics of the motor circuit during operation such that the load imposed upon the motors at any speed of rotation is sensed and automatically compensated for by the circuit to produce substantially uniform film-winding speeds at each film-winding speed setting of the circuit.

Additionally, the electric motor circuit includes means for supplying a supplemental current or bias to the motor that is winding film wherein the tension upon the film may be maintained to prevent inadvertent film unwinding and prevent mistracking, overrun and other problems resulting from uneven film tensions.

Two embodiments of a motor control circuit are described. One circuit utilizes frictional brake means to prevent the film-unwinding reel and spindle from unwinding too freely. The other circuit is completely electronic and uses a resistor connected to the motors series voltage to shunt the unwinding spindle motor and impose an increasing current on the winding motor as the winding speed is increased.

The electric motor circuit also includes a variable resistor for compensating for tolerances of the electric components and regulating the starting position of the motors with respect to the controlling potentiometer.

BRIEF DESCRIPTION OF THE DRAWINGS

The aforementioned objects and advantages of the invention will be apparent from the following description and accompanying drawings wherein.

DESCRIPTION OF THE PREFERRED EMBODIMENT

Figure 1:
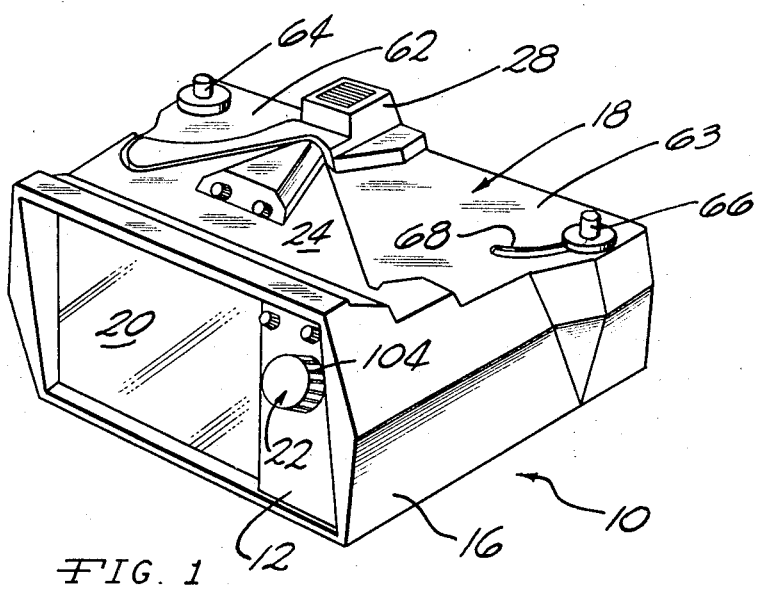
FIG. 1 is a perspective view of a motion picture film viewer constructed in accord with the invention.
Figure 2:
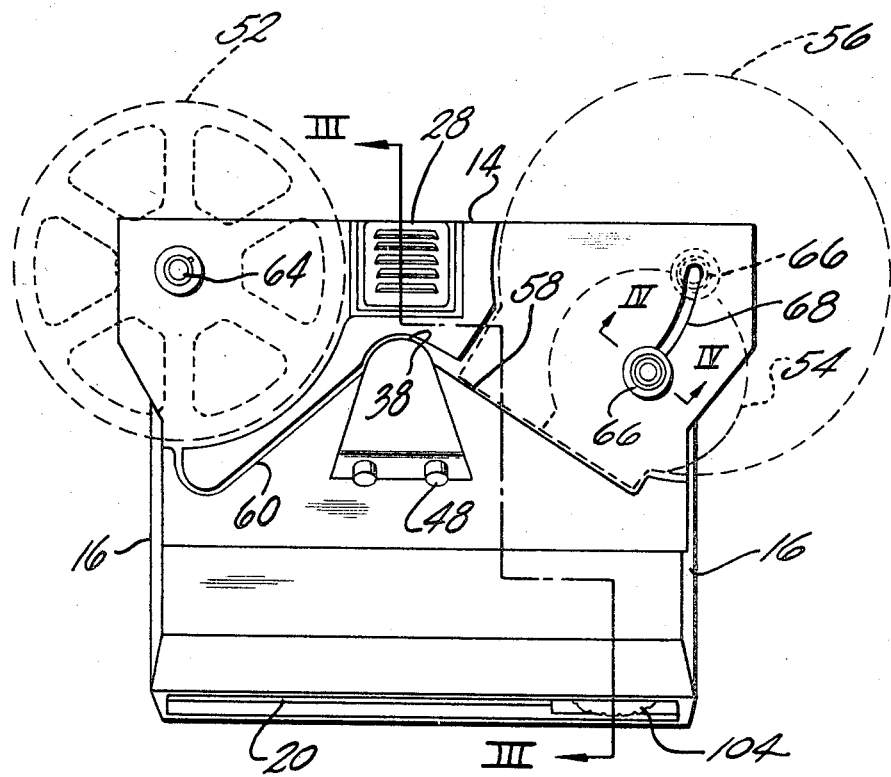
FIG. 2 is a top plan view of the motion-picture viewer of FIG. 1, motion-picture cassettes of various sizes being shown in dotted lines.
Figure 3:
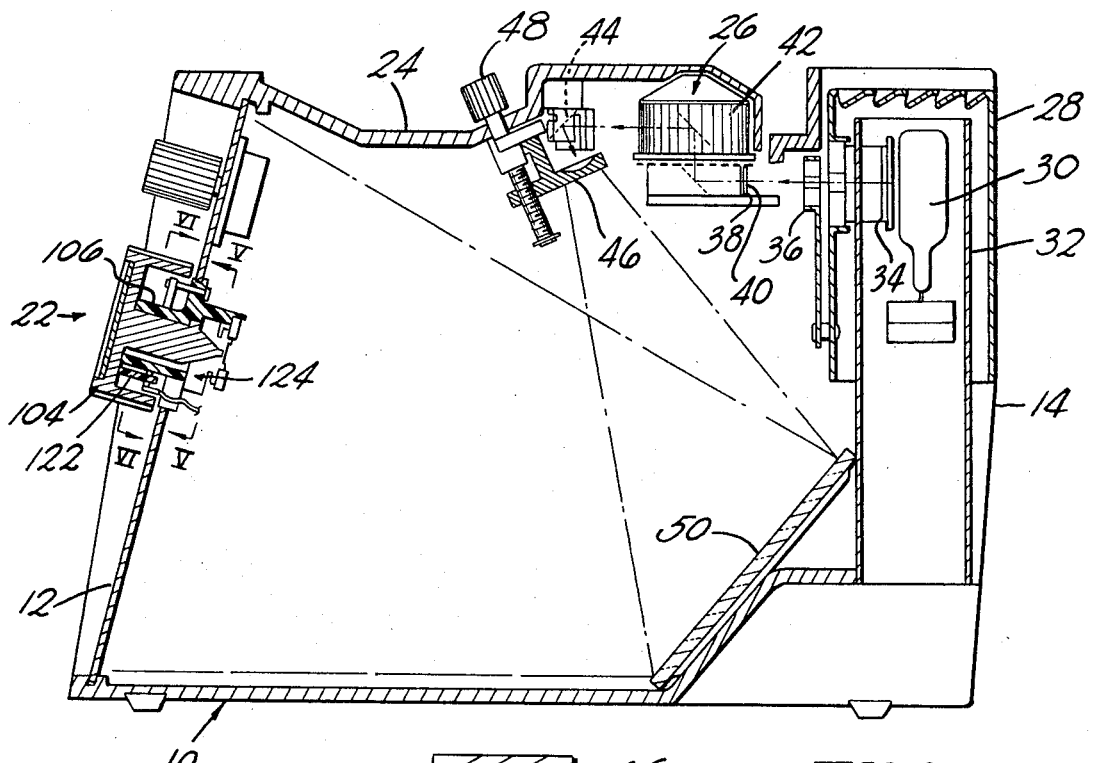
FIG. 3 is an elevational, sectional view taken through the viewer along section III-III of FIG. 2.

The appearance and construction of the motion-picture viewer in accord with the invention is best appreciated from FIGS. 1 through 3 wherein the viewer housing is generally indicated at 10. The housing is of boxlike configuration including a front wall 12, a rear wall 14, lateral sidewalls 16, and an upper horizontally disposed deck 18 imposed over and interconnecting the front, rear and side walls. A translucent viewing screen 20 is mounted within the front wall 12 and the control apparatus, including reel spindle drive control switch 22 may also be mounted in the front wall.

The deck 18 includes a central region 24 having a raised portion under which the film image rectifying device, generally indicated at 26, may be mounted. The rectifying device is preferably of the molded peripheral lens type disclosed in the assignee's copending U.S. Pat. application Ser.

No. 694,473, filed Dec. 29, 1967. As this rectifying device forms no part of the present invention it is only generally described later. The rectifying device includes a lens wheel which is rotated by the film as it moves past the device.

The light source for the motion-picture viewer is mounted within the housing 10 at the rear central portion thereof below louvers defined in the raised lamp receiving portion 28. The lamp 30 is mounted below the louvers within the chimney 32, and a condensing lens 34 and heat filter 36 are disposed in line whereby concentrated light rays pass through the film gate 38 into the image rectifier system 26 wherein the light path is as indicated by the arrows as in FIG. 3. The rectifying system includes a pair of mirrors disposed at 45° whereby a film 40 mounted in the film gate 38 is exposed to light passing therethrough as to be projected through the lens facets of the image-rectifying wheel 42 to be received upon a mirror 44. The image then passes through the film-widening lens 46, which may be adjusted by the knob 48, and the image is received upon the mirror 50 and reflected to the rear surface of the screen 20 for viewing.

With respect to FIG. 2, the film reels are shown in dotted lines and may include film cassettes wherein the film reel is mounted within a holder that may be readily placed upon the viewer. The film takeup reel 52 is mounted on the left, and the supply reels are shown in the form of cassettes at the right. For purpose of illustration a small 50-foot cassette is shown at 54 and a larger 400-foot cassette is shown at 56. Of course, one supply reel or cassette will be used at a time. The film removed from the supply reels follows the film track 58 past the gate 38, and along the film track 60 to the takeup reel 52. The illustrated film track 60 is only one possible configuration, and in a viewer that is to be primarily employed for editing and splicing purposes the film track would likely be substantially simplified with respect to that configuration shown in FIG. 2.

The film reels are mounted upon reel spindles extending vertically upward through the lateral regions 62 and 63 of deck 18, FIGS. 1 and 2. The reel spindle 64 extends through the lateral region 62 and this reel spindle is designated the takeup spindle in that it will support and drive the reel 52 receiving the film removed from the supply reel housed within a cassette, or otherwise mounted upon the spindle 66 supported in the right lateral portion 63 of the deck. In that a number of sizes of supply reels or cassettes may be employed with the apparatus it is desirable that the supply reel spindle 66 be movable toward and away from the film track 58 to accommodate the various sizes available, and this movement is accomplished by mounting the reel spindle 66 within an arcuate slot 68 defined in the deck housing lateral portion 63 transversely disposed toward the adjacent film track 58. Thus, positioning of the reel spindle 66 within its slot permits accommodation of various size supply reels or film reel cassettes.

Figure 4:
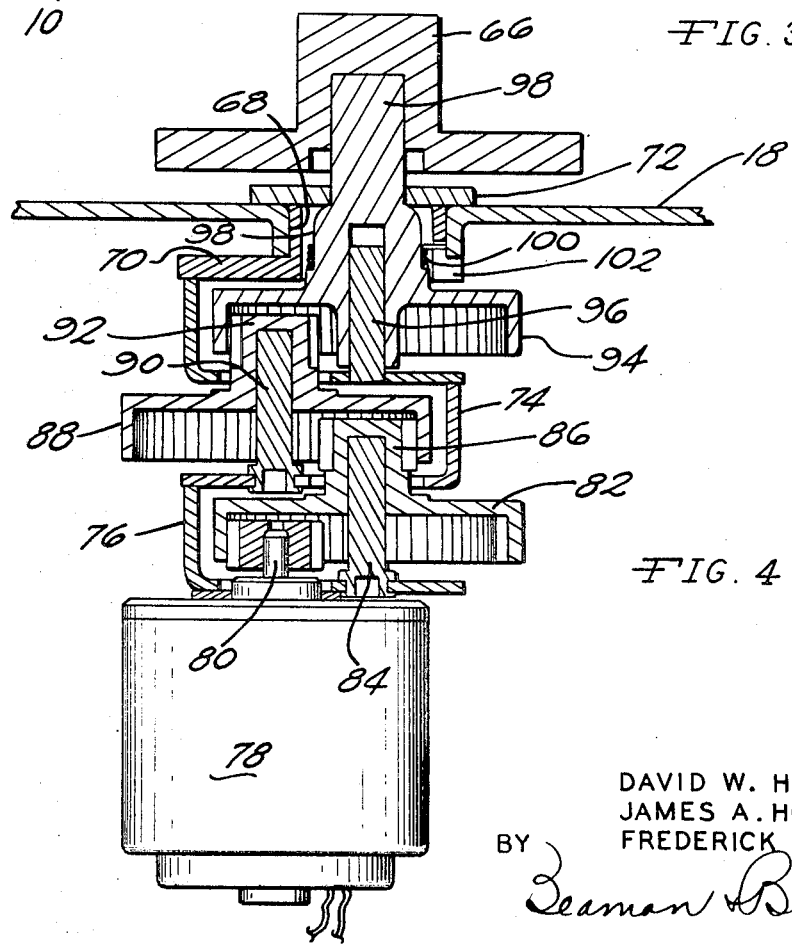
FIG. 4 is an enlarged, elevational, sectional, detail view of the reel spindle when using a friction drag spring, the electric motor and associated gear train as taken along section IV-IV of FIG. 2.

The drive mechanism for the reel spindles 64 and 66 is identical, and is best appreciated from FIG. 4. FIG. 4 illustrates the drive mechanism for the reel spindle 66, which will be identical to that for the spindle 64 except for the provision of the slot 88, and the structure immediately associated with the slot for supporting the spindle and associated mechanism.

The reel spindle 66 is supported within support bracket 70 disposed within the slot 68, including a plate 72 located over the slot. The bracket 70 serves as a support for interconnected gear train supports 74 and 76 which also serve as the support for the electric motor 78. The electric motor 78 includes drive shaft 80 upon which a pinion gear is mounted which meshes with the gear teeth of the gear 82 rotatably mounted upon the shaft 84. The hear 82 includes a pinion gear 86 engaging with the internal gear teeth of the gear 88 rotatably mounted upon the shaft 90. The gear 88 includes a pinion gear 92 which in turn meshes with the internal gear teeth of a gear 94 rotatably mounted upon the shaft 96. The gear 94 includes a shaft portion 98 upon which the rear spindle 66 is mounted, and in this manner the electric motor 78 is capable of rotatably driving the reel spindle through the speed reduction train.

The gear 94 includes a cylindrical portion 98 about which a friction drag member 100 is wound if the friction spring control circuit is desired. The member 100 is in the form of a helical spring wound in a spiral manner about the cylindrical portion 98 and includes a radially extending end receivable within a slot 102 defined in the bracket 70 for preventing one end of the member 100 from rotating. The direction of spiraling of the member 100 is in that direction which will cause the spring to slightly "wind" upon the cylindrical surface 98 when the associated reel spindle 66 is rotating in a film unwinding direction. Thus, when the reel spindle is rotating in a direction as to remove film from the associated reel, a slight resistance to rotation of the reel spindle is produced by the drag member. The helical winding of the member 100 renders the frictional drag produced thereby unidirectional and no significant resistance to rotation of the reel spindle 66 occurs when the reel spindle is driven in a film winding direction.

Figure 6:
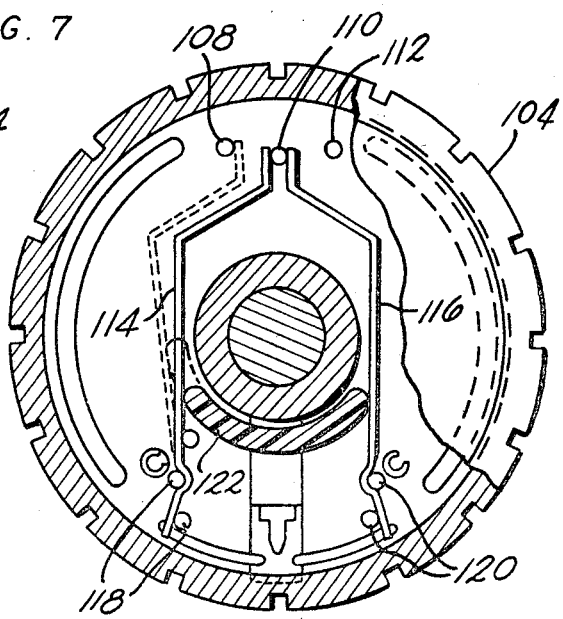
FIG. 6 is an elevational, sectional view taken through the front of the electric control switch illustrating the switch contacts as taken along section VI-VI of FIG. 3.

Control of the electric motors associated with the reel spindles 64 and 66 is accomplished through a single control mounted upon the front wall 12 of the housing 10. The motor control includes a rotatably mounted knob 104 mounted in a bracket 116 affixed to the housing front wall. Contact pins 108, 110 and 112 are mounted at the upper portion of the insulated bracket 106 and a pair of spring leaf contacts 114 and 116 are mounted upon the bracket 106 upon pins 118 and 120 respectively. Electrical conductors are affixed to the pins to establish selective electrical communication with the spring leaf contacts 114 and 116. The spring leaf contacts are biased to normally engage the central pin 110 as shown in full lines in FIG. 6. Deflection of the spring contacts will selectively engage the spring 114 with contact pin 108, or spring contact 116 with pin 112. In FIG. 6 the contact between the spring contact 114 and the pin 108 is shown in dotted lines.

Radial deflection of the contact leaf springs 114 and 116 is accomplished by an axially extending insulated projection 122 mounted on the underside of the knob 104, and the configuration of this projection is such that rotation of the knob clockwise, FIG. 6, will cause deflection of the leaf contact 114 to engage pin 108 in the dotted line position illustrated. Rotation of the knob 104 in a counterclockwise direction engages the leaf spring contact 116 with the pin 112.

Figure 5:
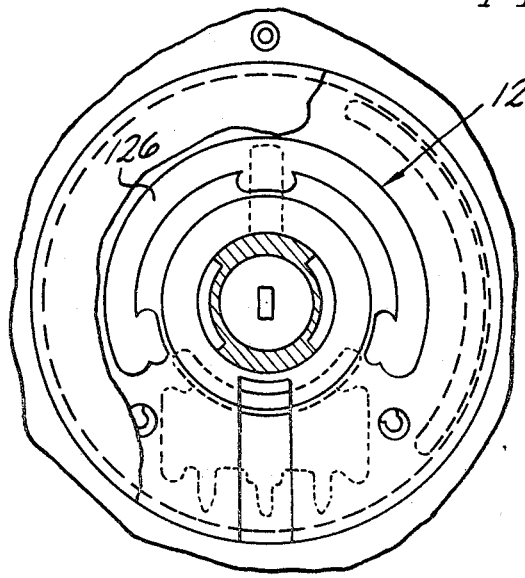
FIG. 5 is a rear, elevational, sectional view of the control switch illustrating the potentiometer strip and associated components as taken along section V-V of FIG. 3.

In that the electric motors driving the reel spindles are to be selectively operated between infinitely variable speed ranges a potentiometer is also associated with the control knob 104 and is generally indicated at 124. The potentiometer includes a resistance 126, FIG. 5, concentrically disposed about the axis of rotation of the knob and a conventional wiper or tap, not shown, engages the resistance 126 to vary the resistance of the control switch during operation.

The knob 104 has a neutral position indicated in full lines in FIG. 6. Rotation in either a clockwise or counterclockwise direction from this neutral position for selectively engaging pins 118 with pin 108 or pins 120 with pin 112 produces the desired electrical circuit. Additionally, initial rotation of the knob from the neutral position causes the resistance to current flowing through the potentiometer to have a maximum value, and the greater the knob is turned away from the neutral position the lower the resistance value of the potentiometer. Thus, maximum rate of rotation of the reel spindles is produced by rotating the control knob its greatest degree in a clockwise or counterclockwise direction. Of course, rotation of the knob in a clockwise direction will produce rotation of the reel spindles in a like direction, while rotation of the control knob from the neutral position in the opposite direction produces a simultaneous like rotation of the reel spindles in the opposite direction. In this manner the operator will be able to accurately control the film movement through the film gate at the desired speed, and little practice is required for one to become acquainted with the control system.

Figure 7:
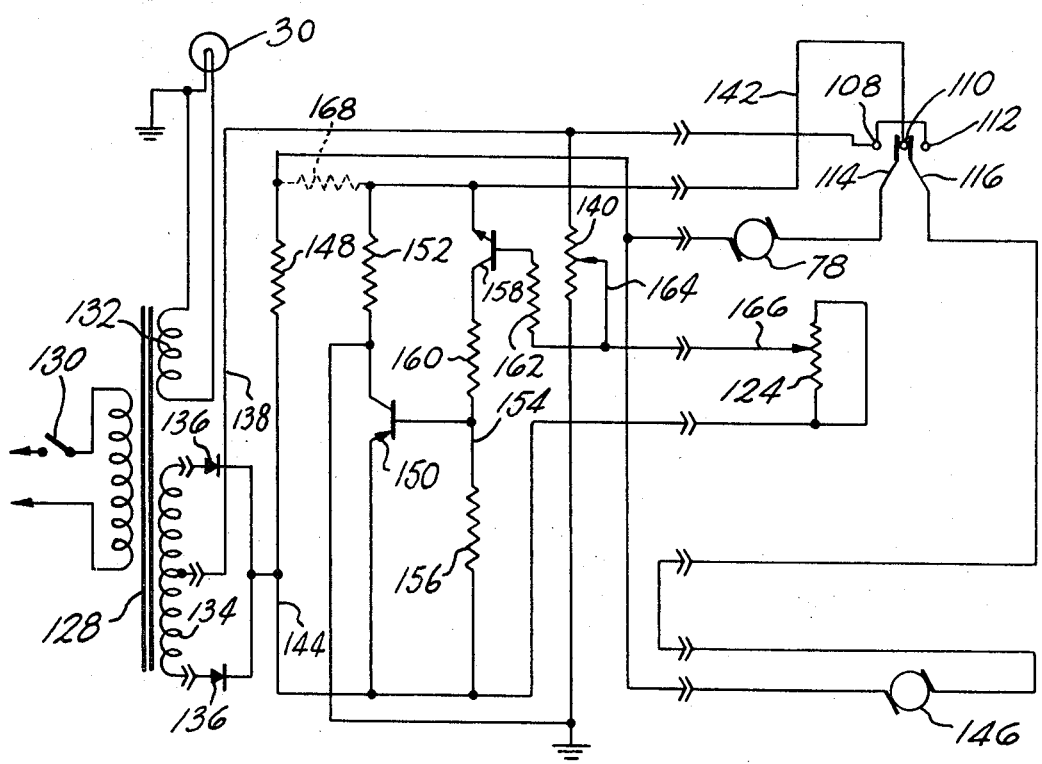
FIG. 7 is a view of the electronic motor control circuit used to control the reel spindle motors, the resistor that is added to eliminate need for the friction drag springs being shown in dotted lines.

The electric circuit used in the control of the electric motors is shown in FIG. 7. The circuit includes a transformer 128 which is energized from a main switch 130 connected to an alternating current power source of usually 110 volts. A secondary winding 132 is used to energize the lamp 30. Another secondary winding 134 includes end terminals connected to diodes 136, and the winding is center tapped by conductor 138. The conductor 138 is connected to the switch pins 108 and 112, and is also connected to ground through a 1K variable resistor 140. The pin 110 is connected by conductor 142 to the collector of the power transistor and the emitter of the control transistor as will be latter described.

The diodes 136 are connected to a conductor 144 which is connected to one side of the film supply motor 78 and the film takeup motor 146 through resistor 148 which is 80 ohms, 2 watts, in the friction spring circuit, and 40 ohms in the shunt resistor embodiment. The other side of the motor 78 is connected to the switch leaf contact 114, while the other side of the electric motor 146 is connected to the contact leaf 116.

The power transistor 150 may be a 2N554 type, and the collector thereof is connected to a 5-ohm, 5-watt resistance 152, and by conductor 142 is connected to the central contact pin 110. The emitter of transistor 150 is connected to the conductor 144, and the base of the transistor is connected to the conductor 154 which is connected to the conductor 144 through the 100-ohm resistance 156. Also, the base of the transistor 150 is connected to the collector of a control transistor 158 through a 100-ohm resistance 160. The control transistor 158 may be of the 2N4123 type, and the emitter thereof is connected to the central contact pin 110 through conductor 142 of the control switch.

The base of the transistor 158 is connected to the tap 164 of the resistance 140 through a 270-ohm resistance 162. Also, the tap 164 is connected to the tap or wiper 166 of the 10K potentiometer which is connected to the conductor 144.

The aforedescribed circuit thereby connects the motors 78 and 146 in series for rotation in like directions and the voltage applied to the motors is supplied by the center tap conductor 138 and the diodes 136 which form a full wave rectifier. The voltage supply to the motors is controlled by varying the voltage drop across the power transistor 150 and the 5-ohm resistor 152 in series with the motors. The voltage drop across the power transistor is varied by varying the current flow from the base to the collector of the transistor. When the voltage drop across the power transistor is large only a small voltage will remain in the circuit for the motors.

Current from the base of the power transistor 150 to its collector is controlled by the control transistor 158 which is in series with the 100-ohm resistor 160. The resistor 160 is for the purpose of limiting the current supplied to the control transistor and preventing damage thereto. When the voltage at the base of the control transistor 158 is slightly more positive than its emitter voltage, the voltage drop across the control transistor will reduce causing the current to flow from the base of the power transistor which in turn reduces the voltage drop across the power transistor and raises the voltage across the motor. The voltage at the base of the control transistor is controlled by varying the resistance of the 10K potentiometer 124. In the described circuit, a "feedback" is provided by variation in the current through the 5-ohm resistor 152. When the current increases in response to an increased load on the motors 78 and 146, the resultant voltage drop across the resistor 152 causes an increased flow through the 1 K resistor 140 raising the voltage at the base of the control transistor 158 and therefore reducing the voltage drop of the power transistor. This raises the voltage across the motors and prevents a reduction in their speed. This feedback thereby produces a steady speed, as initially adjusted, independent of the variation in the load imposed upon the motors due to winding and rewinding of the film.

The 1K resistor 140 permits the system to be adjusted to vary the starting position of the potentiometer 124, and controls the point at which the motors will begin rotation when rotating knob 104. Also, the resistor 140 permits a compensation to the system due to the tolerances of the electronic components.

In the aforedescribed operation the resistor 148 is of an 80-ohm value and the friction drag springs 100 are utilized to prevent the unwinding spindle from "overrunning" or spilling. By a minor modification to the basic circuit of FIG. 7 it is possible to provide a variation in the motor control which eliminates the friction drag springs 100 and provides proper film tension at all speeds of operation.

In this modification of the circuit shown in FIG. 7 the circuit is the same as previously described except that a 10-ohm, 2-watt, shunt resistor 168, shown in dotted lines in FIG. 7, is connected across the conductor between resistor 148 and the motors 78 and 146 and the motor series voltage conductor 142. The effect of the resistor 168 is to shunt a portion of the series voltage controlled by transistor 150 around the motor that is unwinding the film. Also, when resistor 168 is used in the circuit the resistor 148 value is decreased to 40 ohms to increase the unshunted bias current imposed upon the winding motor.

In the circuit embodiment using the resistor 168, the fact that the resistor 168 is connected to the motor series voltage controlled by transistor 150 permits a supplemental voltage to be imposed on the motor driving the spindle winding film which is proportional to the speed of the winding motor as regulated by the potentiometer 124. This supplemental voltage, which is in addition to the supplemental voltage imposed on the winding motor through resistor 148, since it is shunted around the motor driving the reel unwinding film, provides a speed and pull upon the winding motor that will maintain the proper tension in the film due to the greater current upon the winding motor, and the resulting differential in current between the winding and unwinding motors prevents film "-spill" from the unwinding reel when the motors are stopped, or reversed. It will therefore be appreciated that the basic circuit of FIG. 7 is capable of controlling a pair of reel driving motors with or without the use of friction drag springs.

The above-described circuit provides several features highly desirable for film-viewing purposes. For instance, the primary voltage imposed on the drive motors through the power transistor 150 controls the basic motor speed and permits accurate simultaneous operation of the motors due to the series circuit interconnecting the motors to the power transistor. However, the auxiliary or supplemental current supplied to the motor winding film which is controlled by resistor 148 permits the winding motor to maintain a tension upon the film. When the direction of film winding is reversed the auxiliary current through resistor 148 will automatically be imposed upon the other motor, which has now become the winding motor.

The amount of current passing through resistor 148 is not enough to drive the winding motor alone, and the winding motor will not rotate until the voltage from the power transistor is supplied thereto.

As both motors are powered in both directions of rotation the opportunity for the film to become misthreaded or misspooled is minimized, a positive rotation of the film reels during both winding and unwinding is assured.

The rate at which the film passes through the film gate is proportional to the sum of the rates of proportion of the film reels, and the rate of rotation of the reels is proportional to the voltage applied to the motors. As the motors are connected in series the voltage supplied to the motors is in proportion to the rate at which the film passes through the film gate. This ratio exists even through the reels do not rotate at the same speed.

It is appreciated that modifications within the scope of the invention are possible and it is intended the invention be defined only by the scope of the following claims:

We claim:

1. A control system for controlling the winding and rewinding of a film between two film reels wherein each reel is driven by a separate electric motor, comprising, in combination, first and second rotatably mounted reel spindles, film reel supporting means defined on each of said spindles, first and second reversible direct current electric motors drivingly connected to said first and second reel spindles, respectively, conductors connecting said motors in series with each other, a direct current supply, means for supplying a series voltage to said motors for rotating said motors in a common direction, means supplying a supplemental current to the motor rotating its associated spindle in a film winding direction to maintain a tension on the film during winding, and switch means connected to said direct current supply and said motors controlling the direction of rotation of said motors.

2. A control system as in claim 1 wherein said supplemental current is controlled by a resistor connected in parallel with said means supplying said series voltage.

3. A control system as in claim 1 wherein unidirectional friction drag means are associated with each of said spindles imposing a small frictional resistance to spindle rotation only upon the associated spindle rotating in a film-unwinding direction.

4. In a control system as in claim 1, current-sensing means connected in series with said motors sensing the load imposed on said motors and voltage control means controlled by said current-sensing means regulating the voltage supplied to said motors whereby an increased load upon said motors automatically produces an increased voltage through said motors to provide a uniform motor rate of rotation under varying load conditions.

5. In a control system as in claim 1, a potentiometer regulating said series voltage to said motors to regulate the rate of rotation of said spindles.

6. In a control system as in claim 1 wherein said means for supplying a series voltage to said motors includes a power transistor connected to said direct current supply, said power transistor including a base, collector and emitter terminals, said collector terminal being connected in series with said motors, a control transistor having base, collector and emitter terminals, the base terminal of said power transistor being connected to said collector terminal of said control transistor, the emitter terminal of said control transistor being in series with said motors and the base of said control transistor being connected to the emitter of said power transistor through a resistor wherein a voltage at the control transistor base slightly more positive than the emitter terminal voltage produces a current flow from the base terminal of the power transistor to reduce the voltage reduction across the power transistor and thereby raise the voltage supplied to said motors.

7. In a control system as in claim 1 wherein a shunt resistor is connected to said series voltage supply means shunting a portion of said series voltage around the motor rotating its associated spindle in a film-unwinding direction and imposing the shunted series voltage upon the motor rotating its associated spindle in a film-winding direction.